United States Patent
Oppitz et al.

(10) Patent No.: US 6,905,004 B2
(45) Date of Patent: Jun. 14, 2005

(54) PARKING GEAR FOR A MOTOR VEHICLE

(75) Inventors: Horst Oppitz, Dittelbrunn (DE); Wolfgang Purretat, Zahlbach (DE); Stephan Benkert, Bad Brückenau (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/229,416

(22) Filed: Aug. 28, 2002

(65) Prior Publication Data

US 2003/0075391 A1 Apr. 24, 2003

(30) Foreign Application Priority Data

Sep. 5, 2001 (DE) .......................................... 101 43 386

(51) Int. Cl.⁷ .............................. B60T 1/00; B62C 7/02; F16H 57/00
(52) U.S. Cl. ............................... 188/31; 188/69; 74/411
(58) Field of Search ............................. 188/31, 68, 69; 464/73, 74, 76; 192/219.5, 219.4, 219.6, 30 V; 74/411, 577.5, 411.5

(56) References Cited

U.S. PATENT DOCUMENTS

| | | | | |
|---|---|---|---|---|
| 2,394,448 A | * | 2/1946 | Herold et al. ................. | 464/74 |
| 2,739,462 A | * | 3/1956 | Wincenciak .................. | 464/74 |
| 3,066,503 A | * | 12/1962 | Fleming et al. ............... | 464/74 |
| 4,804,075 A | * | 2/1989 | Koitabashi ................... | 464/76 |
| 5,927,149 A | * | 7/1999 | Moody ......................... | 74/443 |
| 5,993,343 A | * | 11/1999 | Rocca et al. ................. | 474/135 |
| 6,279,713 B1 | * | 8/2001 | Young et al. ............. | 192/219.5 |
| 6,419,068 B1 | * | 7/2002 | Stephan et al. .......... | 192/219.5 |
| 6,467,600 B2 | * | 10/2002 | Lee ............................ | 192/219.5 |
| 6,510,934 B2 | * | 1/2003 | Arakawa .................. | 192/219.5 |
| 6,648,783 B1 | * | 11/2003 | Bogner ....................... | 474/134 |
| 2002/0096416 A1 | | 7/2002 | Otto | |

FOREIGN PATENT DOCUMENTS

| | | | |
|---|---|---|---|
| DE | 36 09 377 A1 | 9/1987 | |
| DE | 195 35 239 | 12/1996 | ........... B60K/17/06 |
| DE | 195 33 141 | 2/1997 | ............. B60T/1/06 |
| DE | 100 29 628 | 3/2001 | ........... F16H/63/38 |
| FR | 855.881 | 5/1940 | |

\* cited by examiner

*Primary Examiner*—Thomas Williams
(74) *Attorney, Agent, or Firm*—Cohen, Pontani, Lieberman & Pavane

(57) ABSTRACT

An engagement wheel is mounted so that it can rotate relative to the drive shaft of a drive train in a motor vehicle. To allow rotational driving, the engagement wheel is operatively connected with an element that cannot be rotated relative to the drive shaft by at least one elastically deformable element mounted in the torque path between the engagement wheel and the rotationally fixed element. The elastically deformable element can absorb residual rotational energy of the drive train, when the engagement wheel is locked by a locking element, which may be in the form of a pawl.

15 Claims, 3 Drawing Sheets

PARKING GEAR FOR A MOTOR VEHICLE

BACKGROUND OF THE INVENTION

1. Field of the Invention

The invention concerns a parking gear for a motor vehicle, the gear including an engagement wheel mounted on the drive shaft and a locking element which can engage the engagement wheel.

2. Description of the Related Art

Parking gears are generally known in motor vehicles with hydrodynamic torque converters and serve to prevent unintended movement of the vehicle when the engine is shut off, such that it is customary to lock the transmission output shaft, which is nonrotationally connected with the drive gears. To accomplish this, it is possible, for example, to mount a ratchet wheel nonrotationally on the transmission output shaft. The ratchet wheel can be controlled by a pawl operated by the driver of the vehicle.

There is a need for a parking gear that can already be engaged while a vehicle is still rolling to a stop at speeds starting at about 4 km/h without causing any damage. Loads on the pawl and the ratchet wheel during engagement of the emergency brake as the vehicle is coming to a stop or rolling on a slope are moderated in a conventional vehicle by its drive train. In this connection, the rotating masses that must be abruptly braked, such as the clutch disk and transmission shafts, are relatively small.

Parking gears are also used in electrically driven motor vehicles, and in this case, the transmission input shaft and the ratchet of the emergency brake are rigidly connected with the rotor of the electric motor. If the parking gear is abruptly engaged as the vehicle is coming to a stop, the residual rotational energy of the rotor of the electric motor can act fully on its drive train, which, in contrast to the drive train in a conventional vehicle, is relatively short, i.e., it can also act on the pawl and the ratchet wheel. To prevent failure of the parking gear in this case, suitable means must be employed to dissipate the residual rotational energy of the rotor.

It is well known that the pawl can be elastically mounted, as is described in DE 195 35 239 C1. A disadvantage here is that, when the ratchet wheel is suddenly locked, the finely tuned engagement geometry of the pawl and ratchet wheel is unacceptably altered. Alternatively, the ratchet wheel is connected as a torsionally weak spoked wheel with the transmission input shaft, and undesired oscillations are damped with a device similar to a disk spring. However, the spring effect requires a suitable special material, and the requisite frictional forces require a large contact force or a large frictional diameter. Furthermore, dry operation results in disadvantageous variations in the coefficients of friction.

DE 100 29 628 A1 provides for a multi-disk slip clutch pretensioned with a disk spring as a means of dissipating the residual rotational energy. In dry operation, negative changes in the coefficients of friction on the disks are also to be expected in this solution to the problem. Furthermore, in the case of radial limitation of the space available for the component parts, several frictional surfaces, i.e., several disks, are necessary, which in turn leads to an increased axial assembly space. On the other hand, limitation of the assembly space in the axial direction results in relatively large frictional diameters.

In addition, DE 195 33 141 C1 proposes a conical friction device that is pretensioned by a disk spring as a slip clutch for dissipating residual rotational energy. Here again, we run into the above-described problems with respect to limitation of assembly space and dry operation.

SUMMARY OF THE INVENTION

The goal of the invention is to develop a parking gear with which residual rotational energy can be dissipated without the disadvantages specified above.

The engagement wheel of the parking gear, which is designed as a ratchet wheel, is mounted in such a way that it can rotate relative to the drive shaft and, to allow rotational driving, is operatively connected with an element that cannot be rotated relative to the drive shaft. At least one elastically deformable element is mounted in the torque path between the engagement wheel and the rotationally fixed element, such that the elastically deformable element can absorb the residual rotational energy of the drive train, when the engagement wheel is locked by the locking element. This design makes it possible, on the one hand, to produce a reliable locking effect of the drive shaft and thus a secure parking position of the vehicle, and, on the other hand, to smoothly dissipate any residual rotational energy still present in the drive train at the instant of engagement of the pawl, so that damage to drive train components and other parts of the vehicle is reliably prevented. The parking gear of the invention can be favorably operated in dry operation.

In this connection, the rotationally fixed element can be designed as a flange on the drive shaft.

To transmit torque, the engagement wheel and the flange have webs in the form of teeth. In this way, when the pawl is engaged in the ratchet, the torque to be transmitted is uniformly distributed over the circumference.

To allow mutual rotational driving, the engagement wheel and the flange have form-fitting profiles.

In a further refinement of the form-fitting profiles, webs are formed on the profiles.

To produce an operative connection, the form-fitting profiles of the engagement wheel and the flange are mounted in essentially the same axial position relative to the drive shaft, such that the webs mesh to form chambers, which receive the elastic elements.

An especially useful configuration for saving assembly space is obtained when the engagement wheel and the flange are mounted in essentially the same axial position, i.e., they are arranged radially with respect to each other on the drive shaft.

It is especially advantageous to design the webs of the flange and the engagement wheel to be narrower than the corresponding gaps between the webs. If the webs of one element are positioned in the middle of the gaps of the other, chambers with a U-shaped cross section are obtained, into which elastic elements that likewise have an essentially U-shaped cross section fit. The emergency brake is thus suited for locking the drive train in both directions of rotation.

The strain of an elastic element that accompanies compression during locking of the ratchet and the resulting deformation are accommodated by at least one cavity adjacent to a neighboring elastic element, into which the elastic element can expand when it deforms.

The parking gear of the invention can be used with special advantage in a vehicle powered by an electric motor, in which case the drive shaft is the rotor shaft of the electric motor.

In a vehicle with a transmission, the drive shaft can also be the input shaft of the transmission.

The use of an elastomer as the material for the elastic element has been found to be very advantageous.

When several elastic elements are used, they can be joined by connecting elements, e.g., webs or film hinges. This greatly simplifies their installation in the emergency brake and saves installation time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
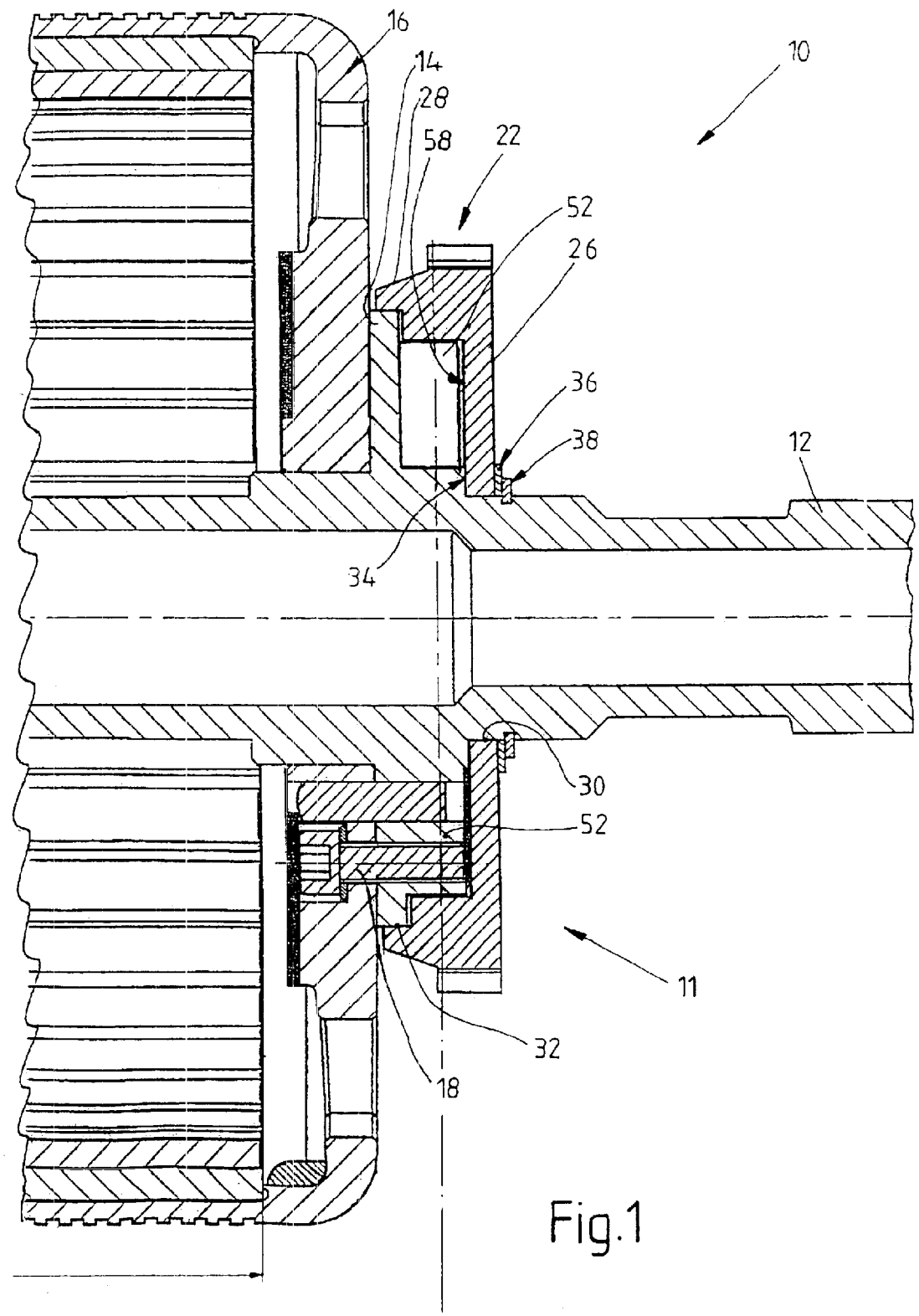
FIG. 1 shows a longitudinal view of a transmission input shaft with the rotor of an electric external-rotor motor and a ratchet wheel of the parking gear.
Figure 2:
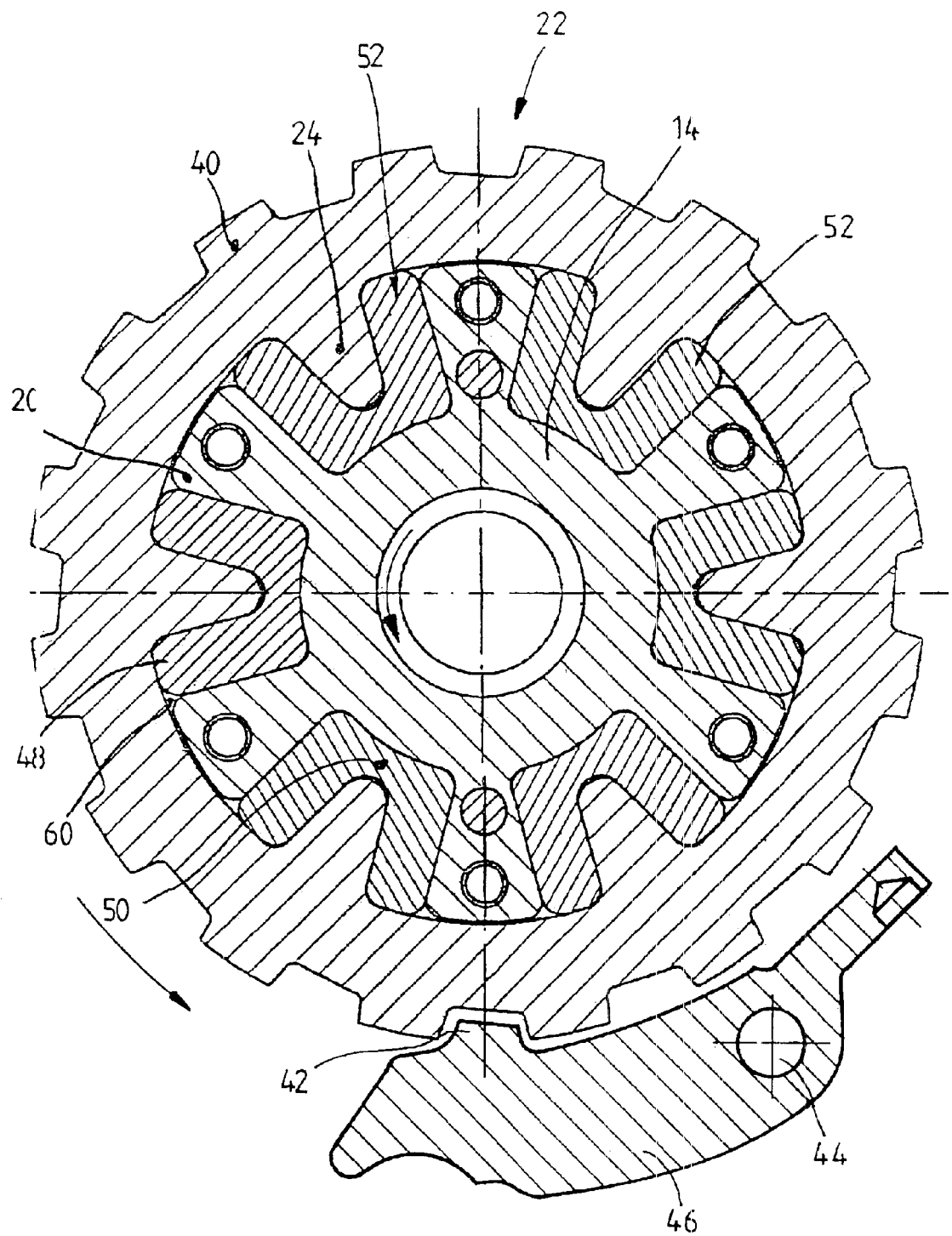
FIG. 2 shows a schematic axial view of the ratchet wheel, including several elastic elements and the pawl of the parking gear.

FIG. 1 shows a cutaway section of a drive train 10 of a motor vehicle with a parking gear 11. The drive gears (not shown) are operatively connected with a drive shaft, in this case, the transmission input shaft 12. The rotor 16 of an electric external-rotor motor (not further shown) is fastened to the drive shaft 12 by means of a rotationally fixed flange 14 with a bolt 18. The use of the invention is not limited to a combination with a specific type of electric motor. As FIG. 2 shows, a number of webs 20 that run radially outward are formed on the flange 14. An engagement wheel in the form of a ratchet wheel 22 is installed on the side of the flange 14 that is axially opposite the rotor 16. It is installed concentrically with the flange 14 in essentially the same axial position. The ratchet wheel 22 has the same number of webs 24, but in this case the webs run radially inward. The flange webs 20 and ratchet wheel webs 24 thus form form-fitting profiles, such that the webs of one profile extend into the spaces of the other profile. The ratchet wheel 22 also has a section 26 that runs radially inward to a radial bearing area 30 where the ratchet wheel 22 is pivoted on the shaft 12. Another radial bearing area 32 is provided where an axial extension 28 is supported on the radially outer region of the flange 14. The radial bearing areas 30 and 32 between the ratchet wheel 22 and the transmission input shaft 12 and between the ratchet wheel 22 and the flange 14 are coated with an anticorrosive friction coating so that they perform frictional work when the pawl is engaged and are thus able to damp any oscillation that may be present. The ratchet wheel 22 is axially secured by mounting it on an axial surface 34 of the transmission input shaft 12; on the opposite side, it is secured by a disk 36 and a securing ring 38 mounted in a groove of the shaft.

FIG. 2 shows an axial view of the ratchet wheel 12. The locking effect of the ratchet wheel 22 is produced first of all by the well-known means of external toothing 40. A catch 42 of a pawl 46 that pivots on a pin 44 is able to engage the tooth spaces of this external toothing 40 to provide positive locking.

Figure 3:
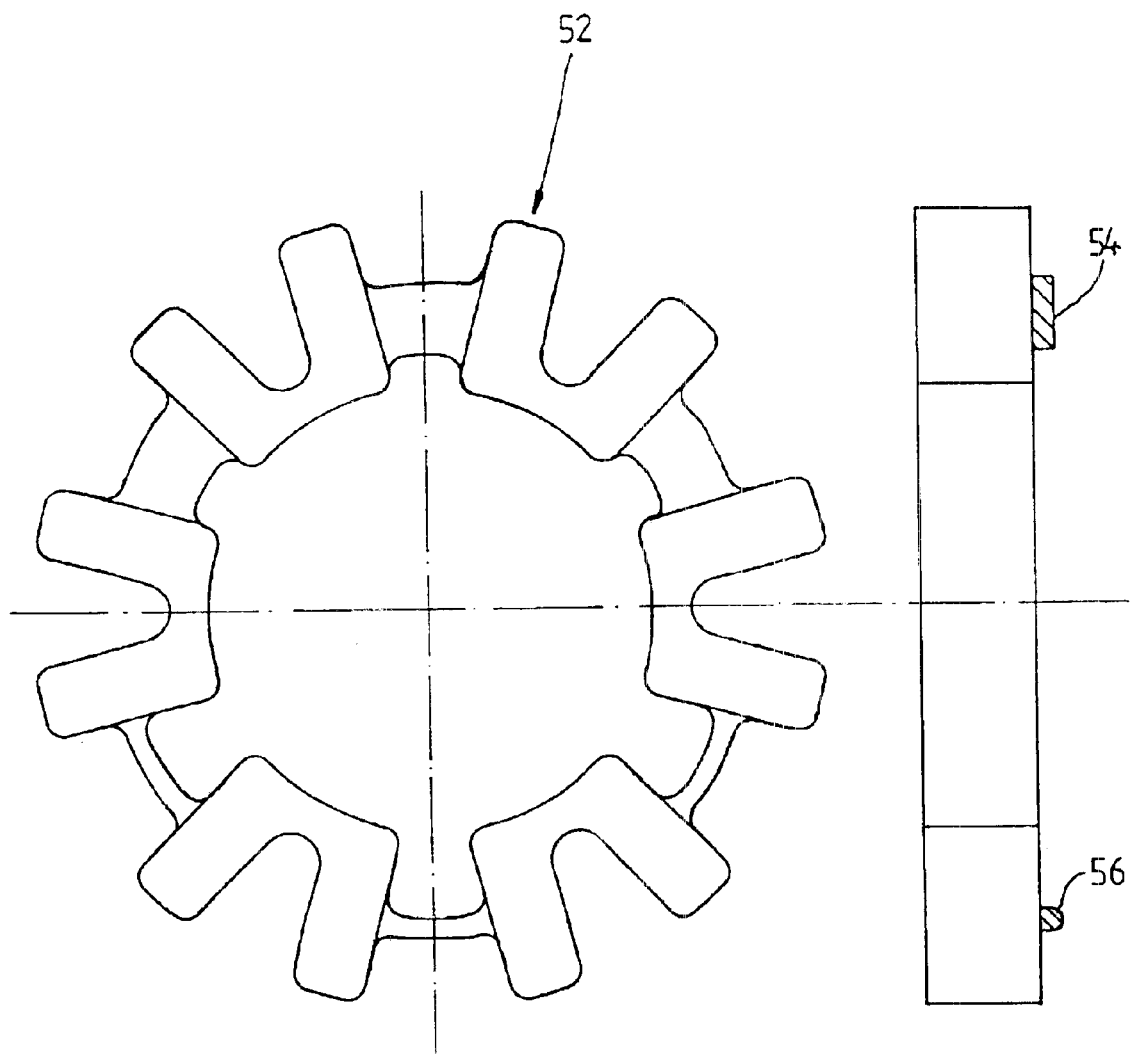
FIG. 3 is a schematic representation of several interconnected molded elastic elements.

The webs 20, 24 are designed in such a way that they do not lie against each other with their whole surfaces, but rather have U-shaped chambers 48, at least in the circumferential direction. This allows the ratchet wheel 22, with its webs 24 in the spaces between two adjacent flange webs 20, to rotate freely at first. The webs 20, 24 are positioned at essentially the same axial level of the transmission input shaft 12, at least in such a way that they partially overlap in the axial direction. Alternatively, the flange 14 and the ratchet wheel 22 may also be positioned axially to each other, in which case the webs also engage each other axially. FIG. 2 also shows that radial spaces 50 are formed between the ends of the webs 24 of the ratchet wheel 22 and the outer contour of the flange 14, while the ends of the flange webs 20 fit tightly against the inner contour of the ratchet wheel 22. U-shaped molded elastically deformable elements 52, which are made of the elastomer HNBR and have the same contour as the U-shaped chambers 48, are inserted in these chambers 48. The elements 52 are held in radially by the webs 20, 24 and are held in axially by the flange 14 and by the section 26 that runs radially inward. In this way, the rotatability of the ratchet wheel 22 in the unengaged state of the parking gear 11 is restricted, but when the brake is engaged, limited rotation is possible, depending on the degree of loading of the brake. The molded elements 52 are not limited to the material cited above as an example. Other materials of sufficient elasticity may also be used. Advantageously, the molded elements 52 are joined by connecting elements 54, 56 similar to film hinges or cords, which are produced, for example, by a spray process. Examples of these kinds of connecting elements are shown in FIG. 3.

If, in a vehicle that is coming to a stop at a speed of about 4 km/h or less, the ratchet wheel 22 is locked by the catch 42 of the pawl 46 by means of an actuating device (not shown), the rotational motion of the drive train 10, with the transmission input shaft 12 and the rotor 16, will persist at first due to inertia. Relative rotation thus occurs between the ratchet wheel 22 and the flange 14, and the elastic elements 52 located in the chambers 48 are pressed and deformed against the webs 24 of the ratchet wheel 22 by the flange webs 20. During this process, the elastic molded elements 52 partially absorb the residual rotational energy of the drive train 10 by elastic spring action and partially dissipate the impact energy and oscillations by internal function. A contraction of the elements 52 that occurs in the direction of motion is accompanied by an expansion in other directions running transverse to the direction of motion. Adjacent to the molded elements 52 in the direction of the flange 14 and the ratchet wheel 22, various cavities are provided, into which the deforming material can expand. These cavities are realized, for example, by an axial gap 58, as shown in FIG. 1, and by axial channels 60, as shown in FIG. 2. Alternatively, the disk 36 may be replaced by an elastic element, and/or recesses may be provided in the molded elements 52.

The characteristic properties of the parking gear 11 can be adjusted by various parameters within certain limits, e.g., the shaping of the molded elements 52, the chambers 48 and the webs 20, 24, as well as the material hardness and material mixture, and the pretensioning of the molded elements 52 when they are installed in the chambers 48.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A parking gear for a motor vehicle with a drive train comprising a drive shaft, said parking gear comprising a flange that is fixed to said drive shaft so that said flange cannot rotate relative to said drive shaft, an engagement wheel which is mounted coaxially with respect to said flange, said engagement wheel being rotatable relative to said drive shaft, said engagement wheel and said flange having webs which are engaged so that torque can be transmitted on a torque path between said engagement wheel and said flange, said webs of said engagement wheel meshing radially between said webs of said flange to form chambers which each have a U-shaped cross-section, said engagement wheel having a radially inward extending section, said flange and said radially inward extending section bounding said chambers axially, a locking element which can engage said engagement wheel to stop rotation of said engagement wheel, and a plurality of elastically deformable elements mounted in the torque path between said engagement wheel and said flange so that said elastically deformable elements can absorb residual rotational energy of the drive train when the engagement wheel is locked by the locking element, said elastically deformable elements each having a U-shaped cross-section and being received in a respective said chamber, said elastically deformable elements extending over respective said webs of one of said engagement wheel and said flange, wherein deformation of said deformation elements out of said chambers is limited by said flange and said radially inwardly extending section of said engagement wheel.

2. A parking gear as in claim 1 wherein said flange is formed on said drive shaft.

3. A parking gear as in claim 1 further comprising an axial gap between each said elastically deformable element and at least one of said radially inward extending section and said flange, said elastically deformable elements expanding axially into said gaps when said elastically deformable elements absorb residual rotational energy.

4. A parking gear as in claim 1 wherein said motor vehicle has an electric motor for driving said vehicle, said electric motor having a rotor shaft, and said drive shaft is said rotor shaft.

5. A parking gear as in claim 1 wherein said motor vehicle has a transmission with an input shaft, and said drive shaft is said input shaft of said transmission.

6. A parking gear as in claim 1 wherein said elastically deformable elements are elastomeric elements.

7. A parking gear as in claim 6 comprising a plurality of said elastomeric elements connected by connecting elements.

8. A parking gear as in claim 1 further comprising at least one radial bearing area between said engagement wheel and at least one of said flange and said drive shaft.

9. A parking gear as in claim 8 wherein said engagement wheel has an axial extension and said flange has a radially outer region, said at least one radial bearing area comprising a radial bearing area between said axial extension and said radially outer area.

10. A parking gear as in claim 9 further comprising at least one axial channel between each said elastically deformable element and said axial extension of said engagement wheel, said elastically deformable elements expanding radially into said axial channels when said elastically deformable elements absorb residual rotational energy.

11. A parking gear as in claim 8 wherein said engagement wheel has a radially inward extending section, said at least one radial bearing area comprising a radial bearing area between said radially inward extending section and said drive shaft.

12. A parking gear as in claim 8 wherein said at least one radial bearing area has a friction coating which damps oscillations between said drive shaft and said engagement wheel.

13. A parking gear as in claim 1 wherein said elastically deformable elements extend over respective said webs of said engagement wheel.

14. A parking gear as in claim 1 wherein all of said chambers receive elastically deformable elements.

15. A parking gear as in claim 1 wherein said flange and said radially inward extending section bound said chambers axially so that said chambers are substantially closed.

* * * * *